United States Patent
Toomey

(10) Patent No.: US 7,040,427 B2
(45) Date of Patent: May 9, 2006

(54) TILLER-STEERED INDUSTRIAL TRUCK

(75) Inventor: Mark Toomey, Moline, IL (US)

(73) Assignee: The Raymond Corporation, Greene, NY (US)

(*) Notice: Subject to any disclaimer, the term of this patent is extended or adjusted under 35 U.S.C. 154(b) by 0 days.

(21) Appl. No.: 10/631,139

(22) Filed: Jul. 31, 2003

(65) Prior Publication Data

US 2005/0023051 A1    Feb. 3, 2005

(51) Int. Cl.
    *B62D 51/04*     (2006.01)

(52) U.S. Cl. .................. 180/19.2; 180/332; 180/19.3

(58) Field of Classification Search ............ 180/19.1, 180/19.2, 19.3; 7/65.1, 65.8, 332, 315; 187/231
See application file for complete search history.

(56) References Cited

U.S. PATENT DOCUMENTS

| | | | |
|---|---|---|---|
| 2,942,679 A * | 6/1960 | Gibson | 180/274 |
| 3,202,233 A * | 8/1965 | Goodacre et al. | 180/13 |
| 3,738,441 A * | 6/1973 | Kemner | 180/65.1 |
| 3,791,474 A * | 2/1974 | Stammen et al. | 180/332 |
| 3,982,767 A | 9/1976 | Larsson et al. | |
| 4,223,901 A | 9/1980 | Klemick | |
| 4,287,959 A | 9/1981 | Inman | |
| 4,300,867 A | 11/1981 | Frees | |
| 4,666,004 A | 5/1987 | Raz | |
| 4,969,794 A | 11/1990 | Larsen | |
| 5,403,024 A | 4/1995 | Frketic | |
| 5,417,536 A | 5/1995 | Cech | |
| 5,524,732 A | 6/1996 | Koke | |
| 5,590,735 A | 1/1997 | Cartier | |
| 5,735,361 A * | 4/1998 | Forrest | 180/6.24 |
| D401,716 S | 11/1998 | Marcel | |
| 5,964,313 A * | 10/1999 | Guy | 180/332 |
| 6,260,646 B1 | 7/2001 | Fernandez et al. | |
| 6,464,025 B1 * | 10/2002 | Koeper et al. | 180/19.2 |
| 6,776,249 B1 * | 8/2004 | Fortin | 180/19.3 |

* cited by examiner

*Primary Examiner*—Tony Winner
(74) *Attorney, Agent, or Firm*—Quarles & Brady LLP

(57) ABSTRACT

An industrial truck having a steering assembly used to steer the industrial truck about a steering axis when a pivotally attached tiller is swung around the truck by an operator. The steering axis is tilted towards the forks of the truck an angle between 2 and 5 degrees from vertical. By tilting the pivot axis, the distal end of the tiller is tilted toward the forks of the truck when rotated to a fully turned position. This improves the maneuverability of the truck near obstacles and allows longer tillers and larger/more comfortable handles to be used without increasing interference with obstacles near the back of the truck.

13 Claims, 7 Drawing Sheets

TILLER-STEERED INDUSTRIAL TRUCK

FIELD OF THE INVENTION

The present invention relates to tiller-steered industrial trucks. In particular, the present invention relates to steering assemblies used with tiller-steered industrial trucks.

BACKGROUND OF THE INVENTION

As shown in FIGS. 1 and 2, standard tiller-steered industrial trucks, referred to herein as industrial trucks, have a steering assembly 1 that is used to steer the truck. The steering assembly 1 typically includes a tiller 2 and a handle 4 fastened to the distal end of the tiller 2. In some manual trucks, in addition to providing steering, the tiller 2 can also be used as a mechanism to provide lift (by interconnecting the tiller with a hydraulic cylinder or other lift mechanism) and to provide manual motive force to move the truck. The steering assembly 1 is also interconnected with a drive wheel 6 such that as the steering assembly 1 is rotated, the drive wheel 6 also rotates with the steering assembly 1.

One problem inherent in standard industrial trucks is their maneuverability in tight spaces. One thing that limits the maneuverability of standard industrial trucks is that they have a steering assembly 1 that has a steering axis A that is vertical. The steering axis is the axis about which the steering assembly 1, and thus the tiller 2, rotates in order to steer the industrial truck. When an industrial truck having a steering assembly with a vertical steering axis is operated near an obstacle 8 (as in a truck trailer or congested warehouse) the combined swing and tilt of the tiller 2 (either to apply force to move the truck or, in a powered truck, to release the required parking brake) limits the maneuverability of the truck because the handle 4 interferes with the obstacle 8 when in a turned position (see FIG. 2).

In the past, shorter tillers and smaller handles have been used to minimize this interference and provide improve maneuverability near obstacles. However, shortening the tiller and/or reducing the size of the handle on these trucks leads to an increase in the required operating force, reduced comfort for the operator, compromise of the ergonomic design of the handle, and reduced performance of the truck. In addition, even with shorter tillers and smaller handles, the position of the handle remains the limiting factor in the maneuverability of the truck.

It would therefore be advantageous to have an industrial truck with improved maneuverability near obstacles. In particular, it would be advantageous to have an industrial truck where the handle is not the limiting factor in the maneuverability of the industrial truck near obstacles, there is no increase in the operating force required to move the truck, and larger handles can be used to improve the comfort and ergonomic design.

SUMMARY OF THE INVENTION

One aspect of the present invention is an industrial truck that includes a pivot frame and a lift frame assembly, that has at least one fork, connected to the pivot frame. A steering assembly is rotatably connected to the pivot frame and is rotatable about a steering axis that is tilted toward the fork at a predetermined angle from vertical. The steering assembly includes a tiller that has a handle formed on its distal end to enable an operator to rotate the steering assembly about the steering axis. By tilting the steering axis toward the fork, the distal end of the tiller is also tilted toward the fork when it is in a fully turned position. This moves the handle toward the fork and away from any obstacle that may be near the back of the truck. This allows longer tillers to be used and larger/more comfortable handles to be used without increasing interference with obstacles near the back of the industrial truck.

Another aspect of the present invention is an industrial truck that includes a power unit that is rotatably connected to the pivot frame and connected to the steering assembly such that the power unit and the steering assembly rotate together. The power unit is rotatable about a drive axis that is aligned with the steering axis of the steering assembly, thereby also tilting the drive axis toward the fork.

Another aspect of the present invention is an industrial truck where the steering axis of the steering assembly is tilted toward the fork and the drive axis of the power unit is vertical. The steering assembly is then connected to the power unit through a multi-axis pivot joint. This allows a conventional power unit, with a vertical drive axis, to be used while still allowing the steering axis of the steering assembly to be tilted toward the fork.

Another aspect of the present invention is an industrial truck that includes a pivot frame and a lift frame assembly, that has at least one fork, connected to the pivot frame. A power unit is rotatably connected to the pivot frame and is rotatable about a steering axis that is tilted toward the fork at a predetermined angle from vertical. The power unit includes a tiller that has a handle formed on its distal end to enable an operator to rotate the power unit about the steering axis.

DETAILED DESCRIPTION OF THE PREFERRED EMBODIMENT

Figure 1:
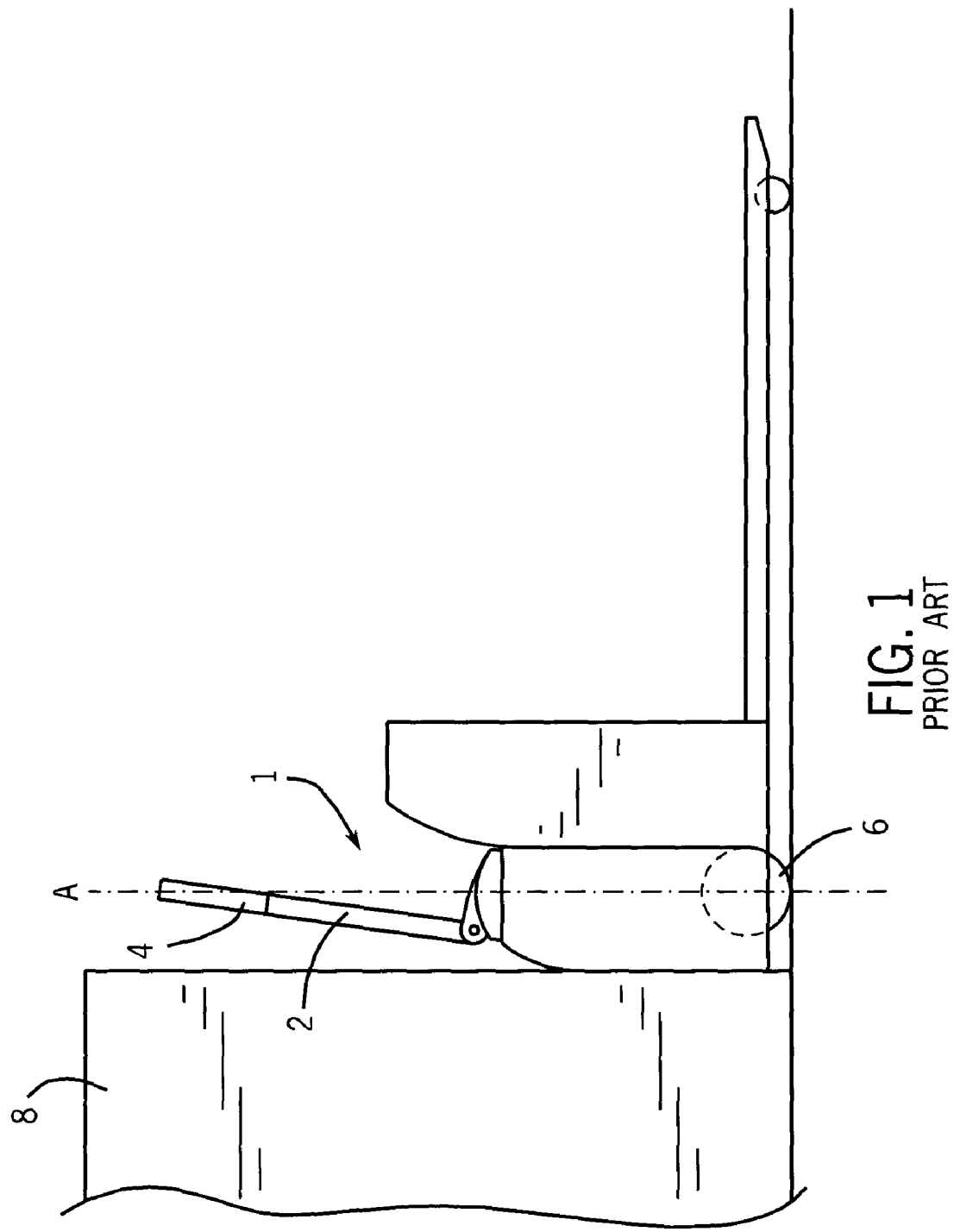
FIG. 1 is a right side view of a standard industrial truck with the tiller and drive wheel in the straight ahead position.
Figure 2:
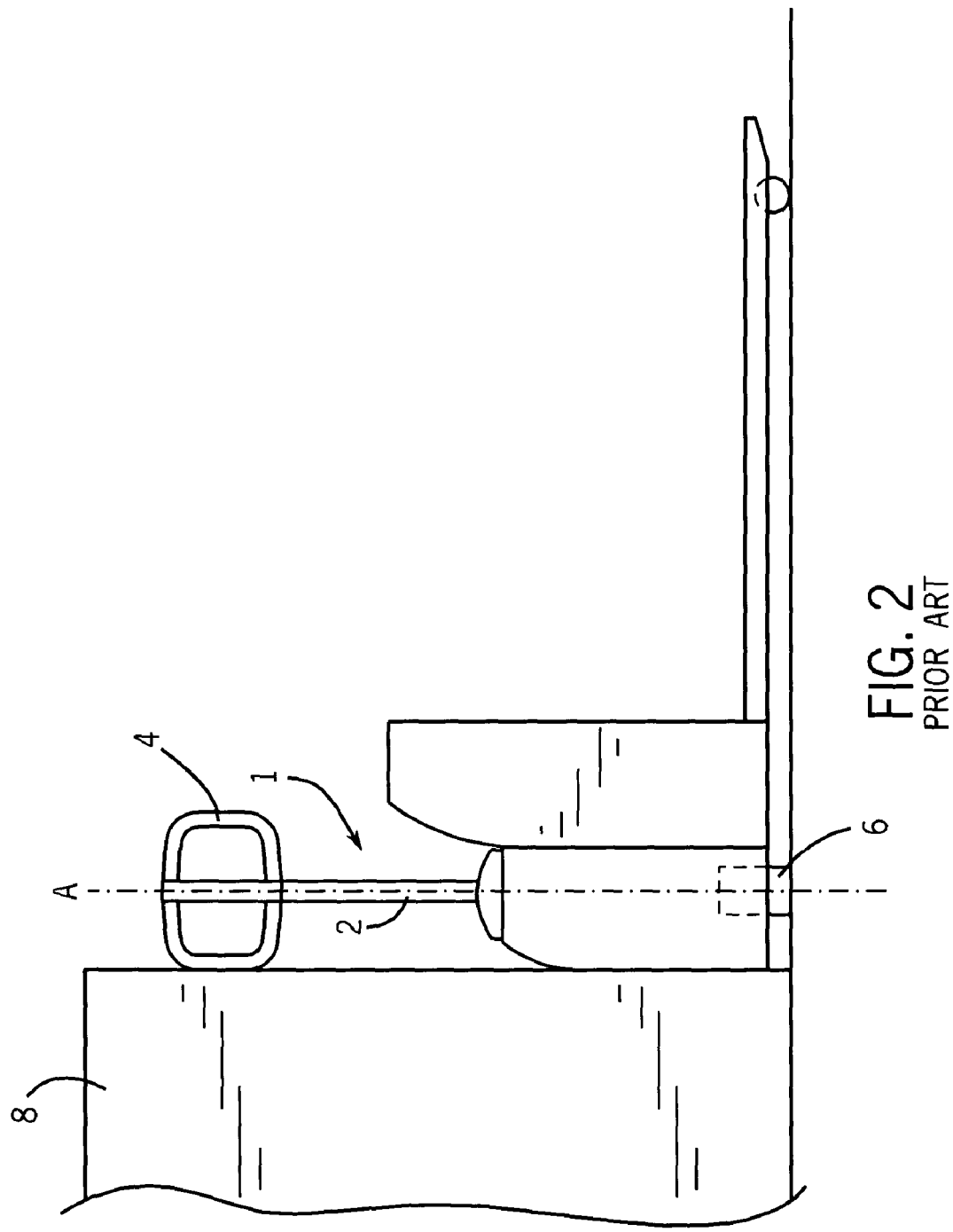
FIG. 2 is a right side view of a standard industrial truck with the tiller and drive wheel in a fully turned position.

Referring to FIGS. 3–6, an industrial truck 10 according to the present invention is shown. Although the embodiment of the invention is described below in relation to a powered industrial truck, the present invention can be used on all tiller-steered industrial trucks (e.g. powered, manual, low-lift, stacker, special use, etc.). The industrial truck 10 comprises generally a conventional lift frame assembly 20, a pivot frame 40, a power unit 60, and a steering assembly 50.

The lift frame assembly 20 is used to support a pallet or other load when the industrial truck 10 is in use. The lift frame assembly 20 includes a pair of forks 24, 25, a battery box 21, and an upper wrapper 22, which are welded or otherwise fastened together. A pair of load wheel assemblies 26, 27 are rotatably fastened to the forks 24, 25 towards the distal end of the forks 24, 25. The load wheel assemblies 26, 27 include wheel forks 28 and load wheels 29 and are used to provide support to the distal ends of the forks 24, 25 and to raise and lower the distal ends of the forks through conventional means. A battery 23 provides power for the industrial truck 10 and is received in the battery box 21. It will be understood that the battery 23 could also be any other appropriate power supply that can provide power for the industrial truck 10 or can be removed in trucks that are manually powered. In the preferred embodiment of the invention, the battery 23 is fastened to the upper wrapper 22 to prevent unnecessary movement of the battery and to provide support in the event that a swing-out industrial battery is used. However, the battery 23 could be secured by its own weight or by other means and it is not necessary to fasten it to the upper wrapper 22.

The lift mechanism (not shown), which provides lift for the industrial truck 10, and the electrical components (not shown) are located within the upper wrapper 22 and are hidden by a cover 18 (see FIG. 5), which is secured to the upper wrapper 22. In the preferred embodiment of the invention, the lift mechanism includes a hydraulic power unit, which includes a pump, hydraulic fluid reservoir, and motor. The hydraulic power unit is connected to a hydraulic cylinder, which is fastened to the pivot frame 40 and connected to the upper wrapper 22. Alternatively, the lift mechanism could also be a chain/sprocket system or any other appropriate mechanism that can provide lift for the industrial truck 10 as required.

Figure 5:
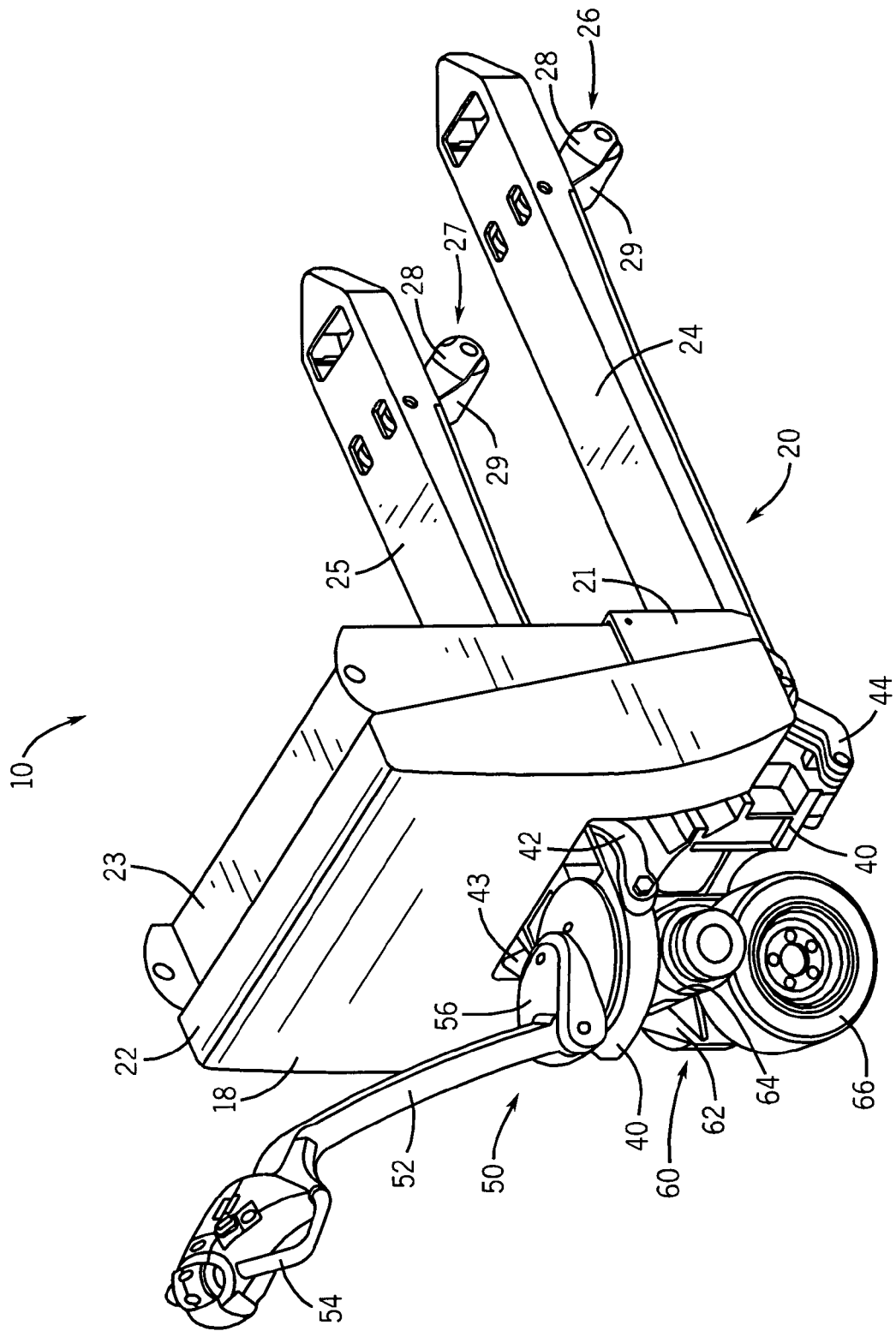
FIG. 5 is a perspective view of the preferred embodiment of the industrial truck according to the present invention with the tiller and drive wheel in a turned position and the lower cover and bumper removed.
Figure 6:
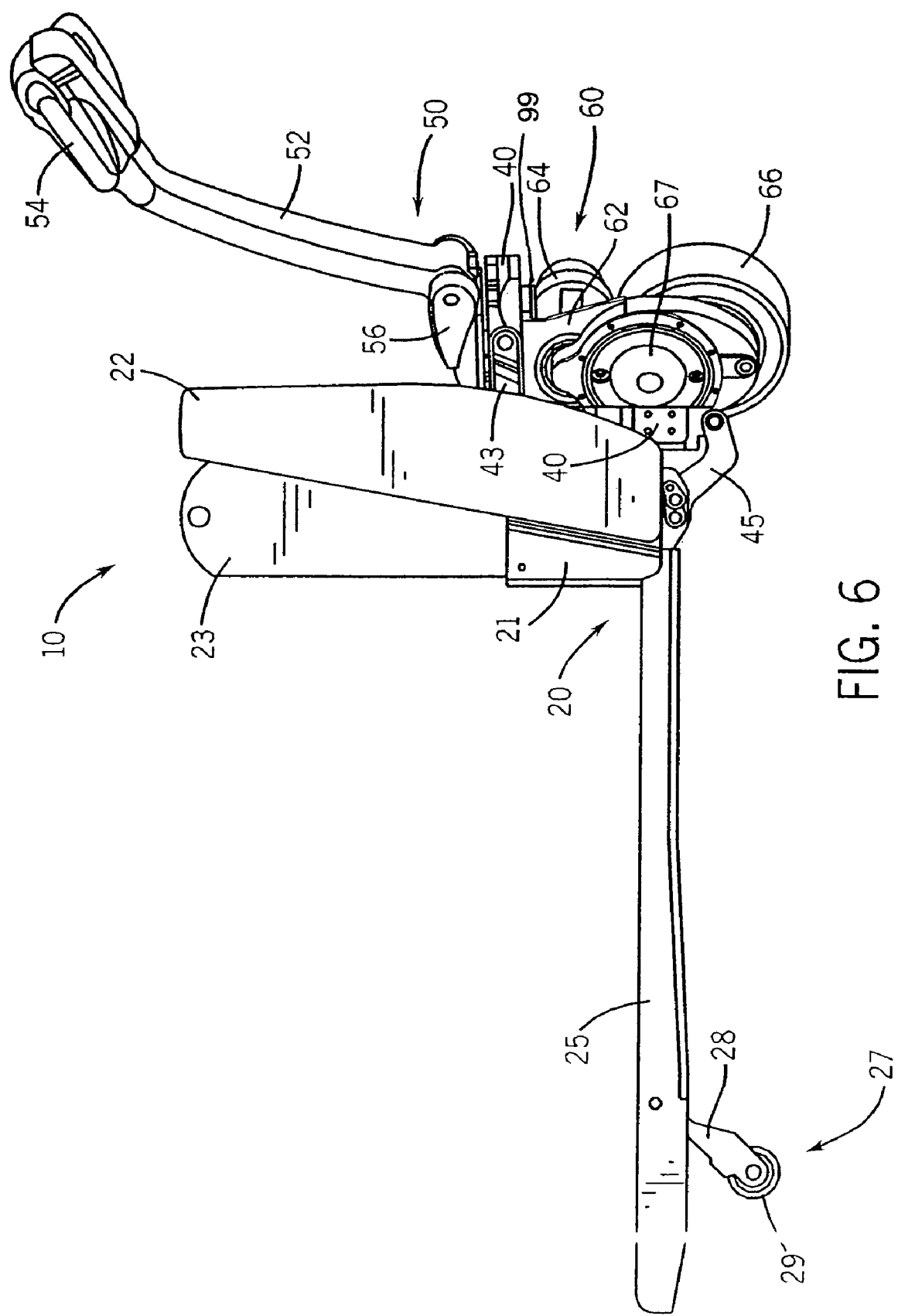
FIG. 6 is a left side view of the preferred embodiment of the industrial truck according to the present invention with the tiller and drive wheel in a turned position and the lower cover and bumper removed.

As can be seen in FIGS. 5 and 6, the pivot frame 40 provides the main structural support for the industrial truck 10. A pair of upper links 42, 43 interconnect the pivot frame 40 to the upper wrapper 22 of the lift frame assembly 20 and a pair of lower links 44, 45 interconnect the pivot frame 40 to the lift frame assembly 20. A pair of lift rods (not shown) are disposed within a channel formed in the bottom of the forks 24, 25. At one end, the lift rods are rotatably fastened to the lower links 44, 45 and at the other are rotatably fastened to the wheel forks 28. The upper links 42, 43 and the lower links 44, 45 are substantially the same length and together form a four bar link mechanism that controls the lifting and lowering of the lift frame assembly 20 in a conventional manner.

Figure 3:
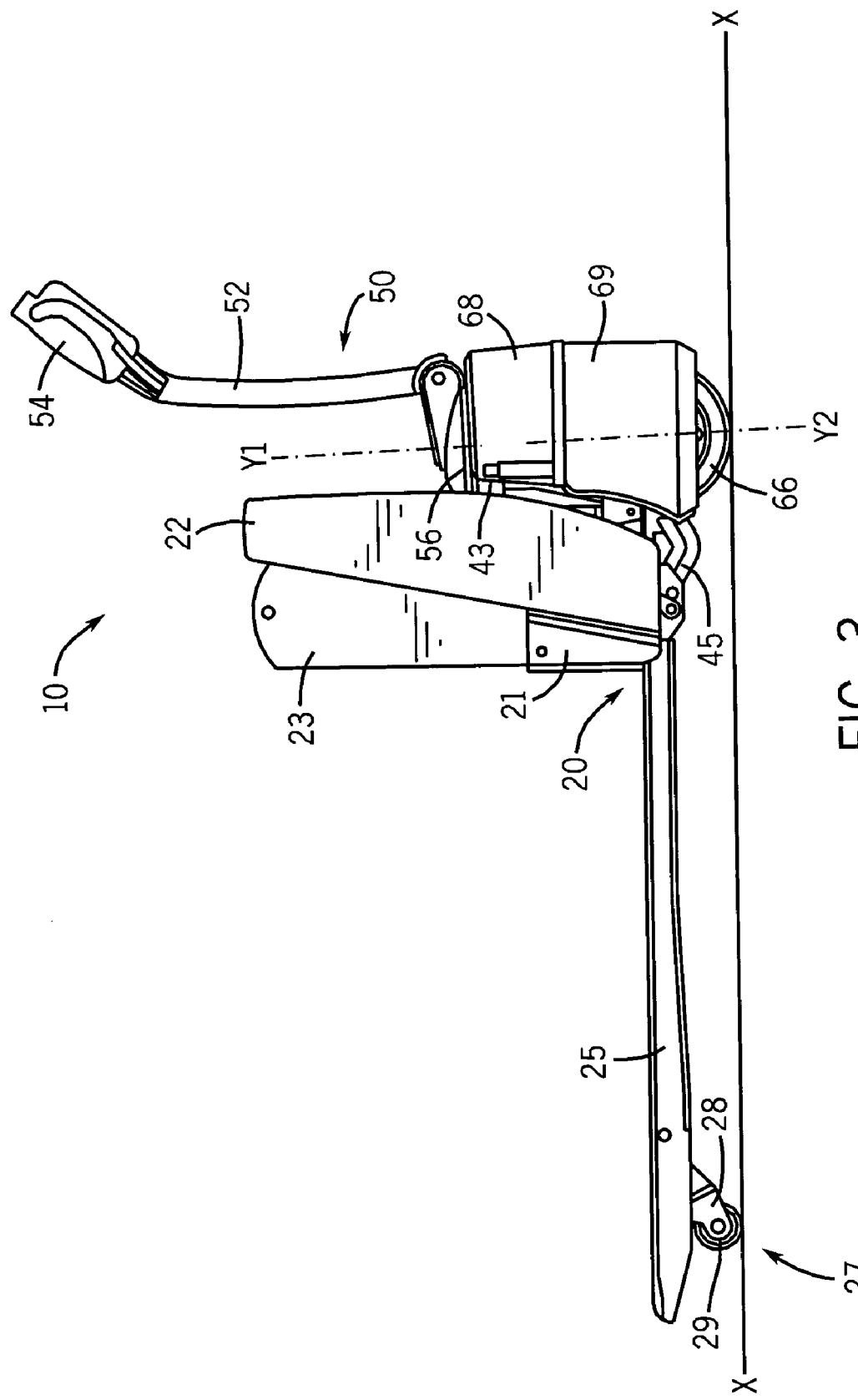
FIG. 3 is a left side view of the preferred embodiment of the industrial truck according to the present invention with the tiller and drive wheel in the straight ahead position.
Figure 4:
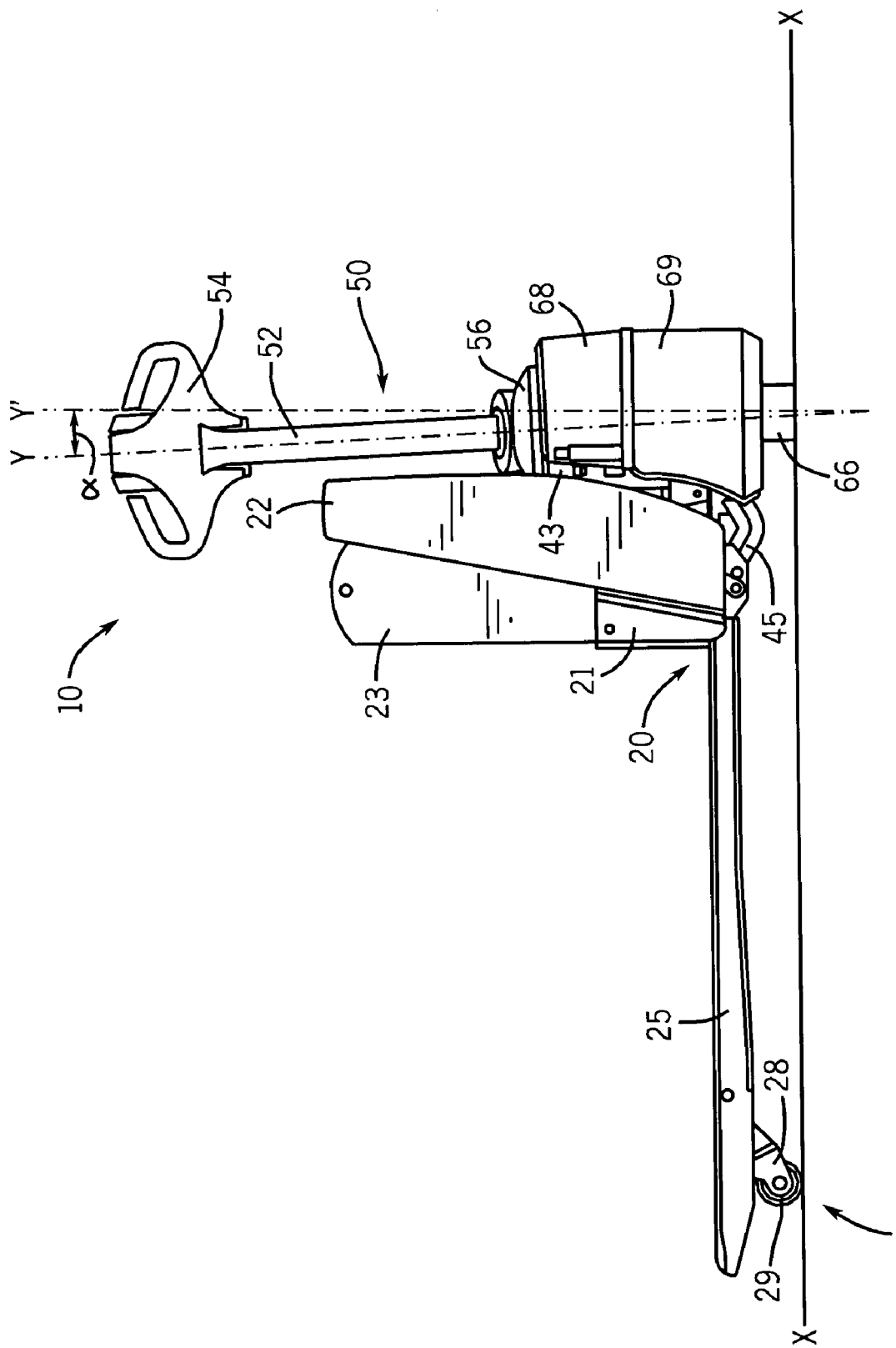
FIG. 4 is a left side view of the preferred embodiment of the industrial truck according to the present invention with the tiller and drive wheel in a fully turned position.

As shown in FIGS. 5 and 6, the power unit 60 includes a transmission housing 62. A motor 64 is fastened to the transmission housing 62 and receives power from the battery 23. A drive wheel 66 is rotatably fastened to the transmission housing 62 and is driven by the motor 64 through a transmission assembly (not shown), which is disposed within the transmission housing 62 and hidden by transmission cover 67, which is fastened to the transmission housing 62. In the preferred embodiment of the invention, the transmission assembly consists of a set of gears that interconnect the motor 64 and the drive wheel 66. However, the transmission assembly could be a belt drive, a chain drive, or any other method of transmitting power from the motor 64 to the drive wheel 66, or can be omitted in the case of manual powered industrial trucks. As can be seen in FIGS. 3 and 4, when the industrial truck 10 is fully assembled, a portion of the pivot frame 40 and the power unit 60 are enclosed by lower cover 68 and bumper 69. As shown in FIG. 3, the power unit 60 rotates about drive axis Y2.

As shown in FIGS. 3–6, the steering assembly 50 includes a tiller 52, which is pivotally fastened at its proximal end to a tiller mount 56. A handle 54 is formed at the distal end of the tiller 52 to allow the operator to steer the industrial truck 10 and, for manual trucks, to allow the operator to provide the force to move the truck. The handle 54 provides a comfortable and ergonomic grip for the operator and includes controls to lift and lower the lift frame assembly 20 and, for powered trucks, to move the industrial truck 10 forward and backward. As shown in FIG. 3, the steering assembly 50 rotates about a steering axis Y1.

The tiller 52 can be rotated in an arc about the steering axis Y1 to allow the operator to steer the truck. This rotation allows the tiller 52 to rotate from a fully turned position at one side of the truck, around the back of the truck, and to a fully turned position at the other side of the truck. In addition, the tiller 52 can be pivoted from a fully upright position, as shown in FIG. 3, downward to a position wherein the operator can comfortably steer and control the truck.

The steering assembly 50 and the power unit 60 are interconnected and are rotatably fastened to the pivot frame 40 such that the drive wheel 66 of the power unit 60 rotates about the drive axis Y2 as the tiller 42 of the steering assembly 50 is rotated about the steering axis Y1. In the preferred embodiment of the invention, the tiller mount 5 and the transmission housing 62 are fastened to the inner race of a steering bearing on opposite sides of the bearing. The steering bearing 99 is then fastened to the pivot frame 40 through the outer race of the steering bearing 99. This interconnects the steering assembly 50 and the power unit 60 such that they rotate together and rotatably fastens them to the pivot frame 40. Alternatively, the steering assembly 50 and power unit 60 could be fastened to the outer race of the steering bearing and the steering bearing fastened to the pivot frame 40 through the inner race or any other suitable method could be used that would interconnect the steering assembly 50 and the power unit 60 and rotatably fasten them to the pivot frame 40. The orientation of the power unit 60, and therefore the direction of travel of the drive wheel 66, is therefore determined by the orientation of the steering assembly 50, which controls the direction of truck motion.

As shown in FIG. 4, in the preferred embodiment of the present invention, the steering axis Y1 and the drive axis Y2 are aligned and together define a pivot axis Y, which is tilted toward the forks 24,25 of the industrial truck 10 a predetermined angle $\alpha$ from a vertical axis Y'. With this tilt of the pivot axis Y, the distal end of the tiller 52 will be tilted towards the forks 24, 25 when in a fully turned position. Preferably, the angle $\alpha$ is between 2 and 5 degrees, which provides acceptable clearance for general purpose industrial trucks. However, the angle $\alpha$ could be any angle that tilts the pivot axis Y forward toward the forks 24,25 of the industrial truck 10 such that the pivot axis Y is not vertical. For example, the angle $\alpha$ could be less than 2 degrees if only slightly more handle clearance were desired. Conversely, the angle $\alpha$ could be greater than 5 degrees in some applications, such as a tiller-steered counterbalance truck, if greater handle clearance were desired.

In the preferred embodiment of the present invention, the tilt of the pivot axis Y is created by tilting the axis of rotation of the steering bearing toward the forks 24, 25 by $\alpha$ degrees from vertical. The tiller mount 56, steering bearing, and transmission housing 62 are fastened such that the steering axis Y1, the drive axis Y2, and the axis of rotation of the steering bearing are all aligned. The steering bearing is then fastened to the pivot frame 40 such that the axis of rotation of the steering bearing is tilted toward the forks 24, 25 the desired amount from vertical. Since the steering axis Y1 and drive axis Y2, which together define the pivot axis Y, are aligned with the axis of rotation of the steering bearing, the pivot axis Y will also be tilted toward the forks 24, 25 the desired amount from vertical.

Fastening the steering bearing to the pivot frame 40 such that the axis of rotation of the steering bearing is tilted toward the forks 24, 25 can be accomplished in many ways. In the preferred embodiment of the invention, the pivot frame 40 is formed such that the surface to which the steering bearing is fastened is not horizontal, but rather is tilted $\alpha$ degrees from the horizontal axis X (see FIGS. 3 and 4). Therefore, when the steering bearing, which has an axis of rotation that is perpendicular to the surface, is fastened to the pivot frame 40, the axis of rotation of the steering bearing will be tilted $\alpha$ degrees from the vertical axis Y'.

Alternatively, the tilt of the axis of rotation of the steering bearing, and thus the pivot axis Y, can be created through any other appropriate means, such as through linkage alterations, angular construction of the steering bearing, shimming of the steering bearing, etc. It will be understood that the method for producing the tilt of the pivot axis Y is not important but tilting the steering axis, and thus the pivot axis in the preferred embodiment, toward the forks of the industrial truck, rather than it being vertical, is the focus of the present invention.

As can be seen in FIG. 4, by tilting the pivot axis Y toward the forks 24, 25 of the industrial truck 10, the distal end of the tiller 52 is also inclined toward the forks of the truck when it is in a fully turned position. This tilt of the tiller 52 moves the handle 54 toward the forks 24, 25 of the industrial truck 10 and away from any obstacle that may be near the back of the truck. This removes the handle 54 as the limiting maneuverability factor and improves the maneuverability of the truck near obstacles. In addition, the tilt of pivot axis Y, and therefore of the tiller 52 when in the fully turned position, allows longer tillers and larger/more comfortable handles to be used without increasing interference with obstacles near the back of the truck. Thus, handles can be made based on human/ergonomic factors rather than being limited by the desired maneuverability of the truck.

In one alternate embodiment of the invention, the power unit is a conventional power unit that has a drive axis that is vertical (i.e. along vertical axis Y') and is not aligned with the steering axis. The drive assembly is then connected to the steering assembly through a multi-axis pivot joint such as a Cardan joint or Hooke's joint. The use of a multi-axis pivot joint allows the steering axis of the steering assembly to be tilted toward the forks of the truck without requiring the drive axis to be tilted at the same angle.

Figure 7:
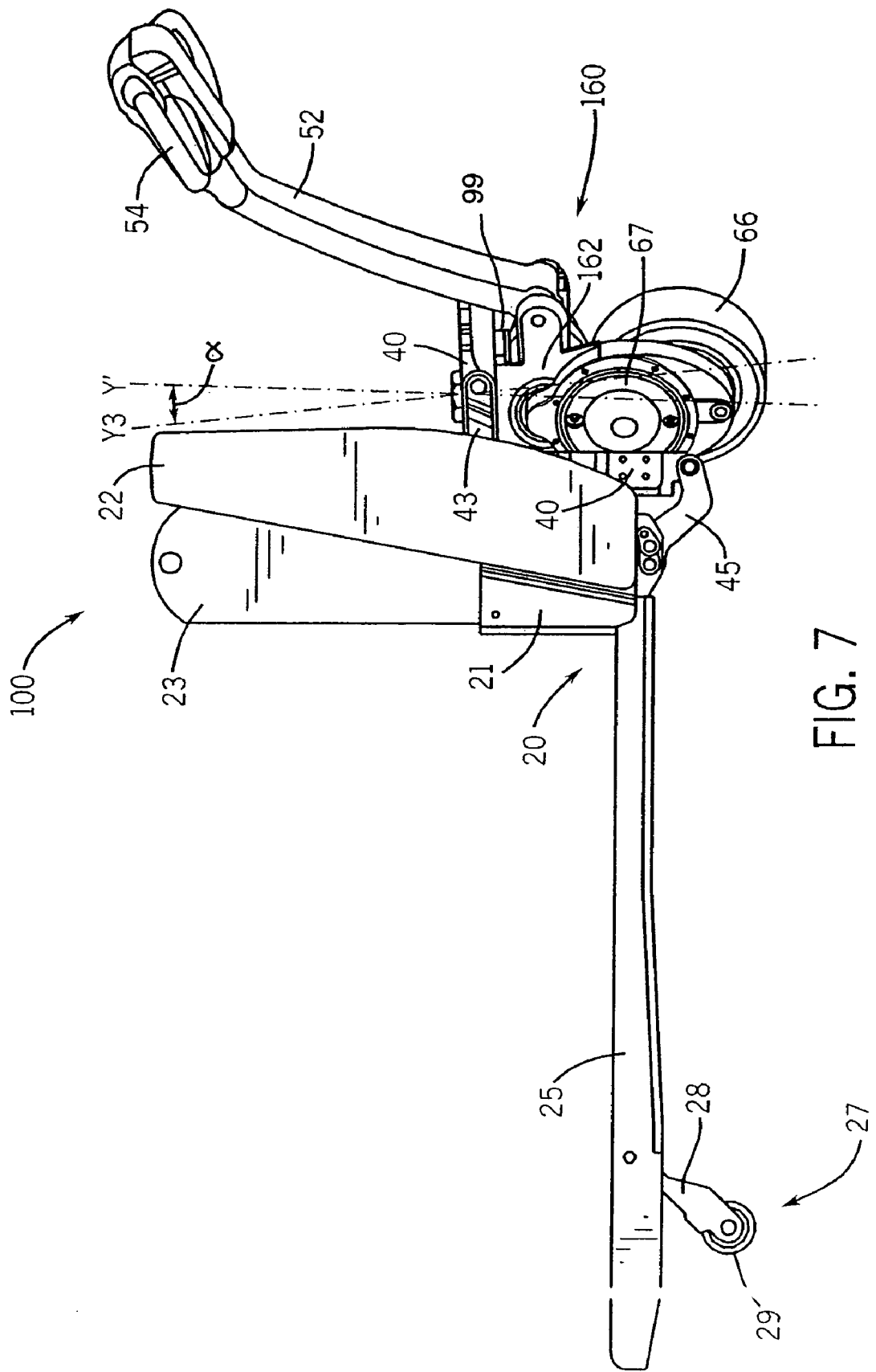
FIG. 7 is a left side view of an alternate embodiment of the industrial truck according to the present invention with the tiller and drive wheel in a turned position and the lower cover and bumper removed.

In another alternate embodiment of the invention, as shown in FIG. 7, the industrial truck 100 is identical to the industrial truck 10 described in the preferred embodiment above except that the steering assembly as been removed. Rather than having a separate steering assembly, the tiller 52 is pivotally fastened at its proximal end to the transmission housing 162 of the power unit 160. The handle 54 is formed at the distal end of the tiller 52 as described above.

As can be seen in FIG. 7, in this embodiment, the axis of rotation of the power unit 160 now defines the steering axis Y3 for the industrial truck 100 and the tiller 52 can be rotated in an arc about the steering axis Y3 to allow the operator to steer the truck. Thus, the drive wheel 66 of the power unit 160 rotates about the steering axis Y3 as the tiller 52 is rotated about the steering axis Y3. In addition, the tiller 52 can be pivoted from a fully upright position downward to a position wherein the operator can comfortably steer and control the truck as in the preferred embodiment described above.

The transmission housing 162 is rotatably fastened to the pivot frame 40 such that the power unit 160 can rotate about the steering axis Y3. In this embodiment, the transmission housing 162 includes a pivot arm which extends vertically from the top of the transmission housing 162 and is rotatably fastened to the pivot frame 40 through a steering bearing 99. Alternatively, the transmission housing 162 could also be fastened to a steering bearing, which is then fastened to a surface of the pivot frame 40, as described in the preferred embodiment above. The orientation of the power unit 160, and therefore the direction of travel of the drive wheel 66, is therefore determined by the orientation of the tiller 52, which controls the direction of truck motion.

As shown in FIG. 7, in this embodiment of the invention, the steering axis Y3 is tilted toward the forks 24, 25 a predetermined angle a from a vertical axis Y'. With this tilt of the steering axis Y3, the distal end of the tiller 52 will be tilted towards the forks 24, 25 when in a fully turned position. Preferably, the angle $\alpha$ is between 2 and 5 degrees, which provides acceptable clearance for general purpose industrial trucks, but could be any angle that tilts the steering axis Y3 toward the forks 24, 25 of the industrial truck 10 such that the steering axis Y3 is not vertical, as described above.

The tilt of the steering axis Y3 is created by tilting the axis of rotation of the steering bearing 99 between the pivot frame 40 and the transmission housing 162 toward the forks by a degrees from vertical. To do this, the steering bearing 99 is fastened to the pivot frame 40 such that the axis of rotation of the steering bearing 99 is tilted toward the forks 24, 25 the desired amount from vertical. The transmission housing 162 is fastened to the steering bearing 99 such that the steering axis Y3 and the axis of rotation of the steering bearing 99 are aligned. Since the steering axis Y3 is aligned with the axis of rotation of the bearings, the steering axis Y3 will also be tilted toward the forks, the desired amount from vertical.

In this embodiment of the invention, just as with the preferred embodiment, by tilting the steering axis Y3 toward the forks 24, 25, the distal end of the tiller 52 is also inclined toward the forks when it is in a fully turned position and has the same advantages as described above.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

What is claimed is:

1. An industrial truck, comprising:
   a pivot frame;
   a lift frame assembly, which includes at least one fork, connected to the pivot frame; and
   a steering assembly rotatably connected to the pivot frame and including a tiller having a handle formed on its distal end to enable an operator to rotate the steering assembly about a steering axis in an arc from one side of the industrial truck to the other to select a direction of motion of the industrial truck; wherein the steering axis is offset at a predetermined angle from vertical toward the at least one fork.

2. An industrial truck, as recited in claim 1, wherein the predetermined angle is between 2 and 5 degrees.

3. An industrial truck, as recited in claim 1, wherein the tiller is pivotally fastened to a tiller mount and the tiller mount is rotatably connected to the pivot frame such that the tiller rotates about the steering axis to steer the industrial truck.

4. An industrial truck, as recited in claim 3, wherein the tiller mount is rotatably connected to the pivot frame through a steering bearing.

5. An industrial truck, comprising:
   a pivot frame;
   a lift frame assembly, which includes at least one fork, connected to the pivot frame; and
   a steering assembly, rotatably connected to the pivot frame and rotatable about a steering axis that is tilted toward the fork at a predetermined angle from vertical;
   a power unit rotatably connected to the pivot frame, such that the power unit is rotatable about a drive axis, and connected to the steering assembly such that the steering assembly and the power unit rotate together; wherein
   the steering assembly includes a tiller having a handle formed on its distal end to enable an operator to rotate the steering assembly about the steering axis and the steering axis and the drive axis are aligned and together define a pivot axis of the industrial truck.

6. An industrial truck, as recited in claim 5, wherein the predetermined angle is between 2 and 5 degrees.

7. An industrial truck, as recited in claim 5, wherein the tiller is pivotally fastened to a tiller mount and the tiller mount is rotatably connected to the pivot frame such that the tiller rotates about the steering axis to steer the industrial truck.

8. An industrial truck, as recited in claim 7, wherein the tiller mount is rotatably connected to the pivot frame through a steering bearing.

9. An industrial truck, as recited in claim 8, wherein the power unit is connected to the steering assembly through a multi-axis pivot joint.

10. An industrial truck, as recited in claim 9, wherein the multi-axis pivot joint is a Cardan joint.

11. An industrial truck, as recited in claim 10, wherein the power unit comprises:
    a transmission housing rotatably connected to the pivot frame and rotatable about the drive axis;
    a motor fastened to the transmission housing; and
    a drive wheel rotatably connected to the transmission housing and driven by the motor through a transmission assembly.

12. An industrial truck, as recited in claim 11, wherein the transmission housing is rotatably connected to the pivot frame through a steering bearing.

13. An industrial truck, comprising:
    a pivot frame;
    a lift frame assembly connected to the pivot frame, the lift frame including at least one fork that extends away from the pivot frame;
    a power unit rotatably connected to the back of the pivot frame for rotation about a steering axis and including a tiller, the tiller having a handle formed at its distal end and being rotatable in an arc from one side of the industrial truck, around the back of the industrial truck, and to the other side of the industrial truck, to rotate the power unit about the steering axis, wherein the steering axis is tilted toward the fork a predetermined amount from vertical such that the distal end of the tiller tilts toward the fork when in a fully turned position; and
    a drive wheel rotatably connected to the power unit, the direction of wheel rotation being determined by the rotatable orientation of the power unit to control the direction of motion of the industrial truck.

* * * * *